United States Patent [19]

Miyashita et al.

[11] 4,144,469

[45] Mar. 13, 1979

[54] STRESS PROTECTION FOR PERMANENT MAGNET TYPE SYNCHRONOUS MOTOR

[75] Inventors: Kunio Miyashita; Hironori Okuda, both of Hitachi; Seizi Yamashita, Katsuta; Shoji Tanabe, Sakura, all of Japan

[73] Assignee: Hitachi, Ltd., Japan

[21] Appl. No.: 822,788

[22] Filed: Aug. 8, 1977

[30] Foreign Application Priority Data

Aug. 9, 1976 [JP] Japan .................................. 51-94710

[51] Int. Cl.² ............................................. H02K 21/12
[52] U.S. Cl. ..................................................... 310/156
[58] Field of Search ...................................... 310/156

[56] References Cited

U.S. PATENT DOCUMENTS

| | | | |
|---|---|---|---|
| 2,303,893 | 12/1942 | Müllner | 310/156 |
| 2,519,895 | 8/1950 | Edwards et al. | 310/156 X |
| 2,522,233 | 9/1950 | Merrill | 310/156 |
| 2,831,992 | 4/1958 | Blackburn | 310/156 |
| 3,531,670 | 9/1970 | Loudon | 310/156 |
| 4,067,101 | 1/1978 | Ono | 310/156 X |

*Primary Examiner*—Mark O. Budd
*Attorney, Agent, or Firm*—Craig & Antonelli

[57] ABSTRACT

A rotor of a permanent magnet type synchronous motor comprises a rotary shaft, a rotary supported by the rotary shaft and including an alternate disposition of a core section in the form of a lamination of a magnetic material which is stacked in the axial direction and a reinforcement section of a non-magnetic material and cavities axially formed in the core and reinforcement sections by passing therethrough, permanent magnets received in the cavities, and a strap interposed at least between the radial outer surface of respective permanent magnets and the opposing inner wall of the cavity, whereby distribution of pressures resulting from a centrifugal force due to the rotation of the rotor, which pressures are imparted on the inner wall of the cavity by the outer surface of the permanent magnet, is uniformed or shared by the strap, thereby preventing the permanent magnet from being fractured.

6 Claims, 9 Drawing Figures

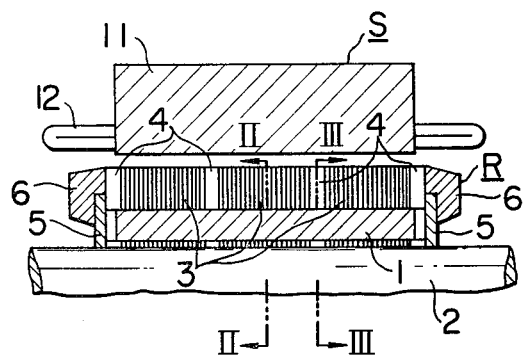
FIG. 1
PRIOR ART
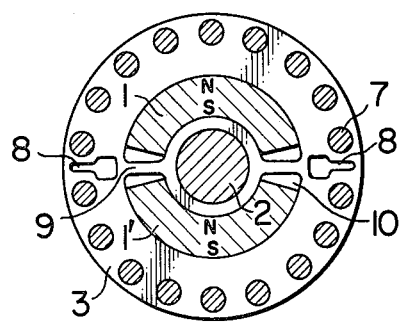
FIG. 2
PRIOR ART
FIG. 3
PRIOR ART
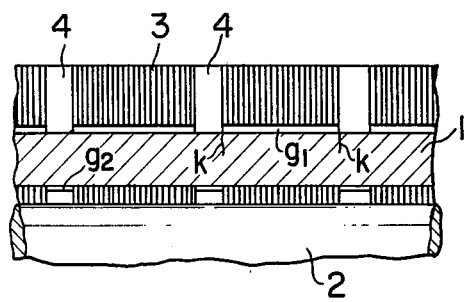
FIG. 4
PRIOR ART
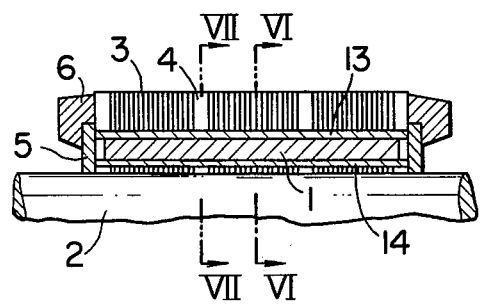
FIG. 5
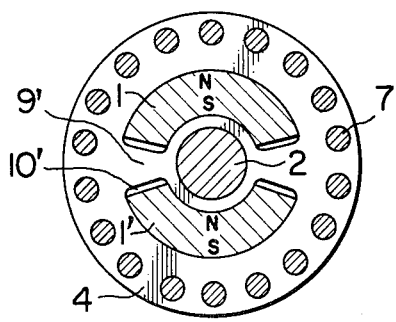

STRESS PROTECTION FOR PERMANENT MAGNET TYPE SYNCHRONOUS MOTOR

LIST OF PRIOR ART REFERENCE (37 CFR 1.56 (a))

The following reference is cited to show the state of the art:

U.S. Pat. No. 3,445,700 Prange et al issued May 20, 1969.

BACKGROUND OF THE INVENTION

1. FIELD OF THE INVENTION

This invention relates to a rotor of a permanent magnet type synchronous motor and more particularly to a rotor structure of a permanent magnet type synchronous motor which is suitable for a high speed rotation.

1. DESCRIPTION OF THE PRIOR ART

Widespread use is being made to a permanent magnet type synchronous motor having a rotor structure incorporated with permanent magnets and squirrel-cage type windings since the synchronous motor of this type is easy to operate, of high efficiency and high power factor. Particular application is advantageously made to textile machines such as spinning machines since when operated in parallel, a number of synchronous motors of this type can easily be uniformed for their speed controlling.

The permanent magnet type synchronous motor has a rotor structure incorporated with permanent magnets which undergo a large centrifugal force during its rotation and hence it requires a mechanically strong rotor. Especially, for a super high speed rotation of about 10,000 r.p.m., it is necessary to provide the rotor with a construction resistive to an accordingly large centrifugal force.

Referring to FIGS. 1 to 4, there is schematically shown a principal part of a permanent magnet type synchronous motor, as a prior art, which comprises a rotor structure having an reinforcement plate interposed between rotor cores for the purpose of promoting the resistivity to the large centrifugal force.

As will be seen from these figures, a rotor structure R comprises permanent magnets 1 and 1' made of ferrite, a rotary shaft 2 made of a non-magnetic material, rotor cores 3 each of which is in the form of a lamination of silicon steel sheets which is stacked in the axial direction, non-magnetic reinforcement plates 4 each of which is in the form of a lamination of stainless steel sheets which is stacked in the axial direction, end plates 5 mounted on both ends of the rotor, and end rings for short-circuiting squirrel-cage windings at their ends. A stator structure S opposing the rotor structure comprises a stator core 11 and armature windings 12 wound on the stator core.

Sector cavities, the number of which corresponds to that of magnet poles such that for a two-magnet pole motor, for example, a pair of cavities are provided, are formed axially and symetrically with the rotary shaft in the rotor core and reinforcement laminations by passing therethrough, and as shown in FIG. 2 the permanent magnets 1 and 1' are received in the sector cavities. Thus, the permanent magnet is protected against vibrations and shocks by the rotor core and the reinforcement plate. To prevent the short-circuit of magnetic flux from the permanent magnets 1 and 1', the rotor core 3 is formed with respective slits 8 each of which is located between one end of the permanent magnet 1 and one end of the permanent magnet 1', bridges 9 connecting inner and outer portions of the rotor core have each a narrow width and in addition, relatively large air gaps 10 are formed between sides of bridges 9 and sides of permanent magnets 1 and 1'. The slit 8, narrow width bridge 9 and air gap 10, however, impair the mechanical strength of the rotor core 3.

On the other hand, the reinforcement plate 4 made of a non-magnetic material such as stainless steel sheet has a configuration as shown in FIG. 3. As being made of the non-magnetic material and posing no problem of the magnetic flux sheet circuit, the reinforcement plate is dispensed with the slit 8 and it has bridges 9' of a large width, making it possible to make small air gaps 10' between sides of the permanent magnets 1 and 1' and sides of the bridges 9'. In some cases, when diecasting aluminum to form the squirrel-cage windings 7, the air gaps are also filled with die-casting aluminum. By virture of this construction, the reinforcement plate 4 as shown in FIG. 3 is mechanically robust.

In other words, a plurality of the non-magnetic reinforcement plates 4 disposed axially can afford a robust rotor structure of permanent magnet type synchronous motor operating at a high speed.

However, the reinforcement plate 4 and rotor core 3 are made of different materials which differ in hardness, temperature coefficient and the like properties and hence they undergo different thermal expansions due to variation in temperature during manufacture, resulting in difficulties for making identical in dimension the reinforcement plate and rotor core. In operation, the reinforcement plate and the rotor core also undergo different thermal expansions due to temperature rise with the result that the radial dimension of the cavity becomes different one portion corresponding to the rotor core to the other portion corresponding to the reinforcement plate. This imposes an excessive local load on the permanent magnets 1 and 1'.

This problem will be detailed with reference to FIG. 4 illustrating the principal part of rotor structure. As shown therein, the outer surface of the permanent magnet 1 is in intimate contact with the reinforcement plate 4 by a large centrifugal force during rotation of the rotor whereas a small air gap $g_1$ lies between this outer surface and the inner surface of the cavity in the rotor core 3. Between the inner surface of the permanent magnet 1 and the reinforcement plate 4 lies a small air gap $g_2$.

Under these conditions during rotation of the rotor at a high speed, local cracks k take place at stressed points on the permanent magnet 1 mainly near the boundary between the rotor core 3 and the reinforcement plate 4. As these cracks k grow and increase, the permanent permanent magnet 1 tends to fracture into segments, giving rise to cause for rotational unbalance of the rotor. In consequence, unwanted vibrations added to the normal rotary movement of the rotor increase and hence bearings on which the drive shaft is journaled are loaded excessively.

SUMMARY OF THE INVENTION

An object of the present invention is to provide an improved rotor structure of a permanent magnet type synchronous motor which can rotate stably by eliminating irregular loads on the permanent magnet thereby to prevent the creation of cracks therein during high speed rotation of the rotor.

According to this invention, the above object can be accomplished by providing a rotor structure of a permanent magnet type synchronous motor wherein a strap is interposed between the outer surface of a permanent magnet and a rotor including a non-magnetic reinforcement section and a core section to decrease a shoulder at the interface between the reinforcement section and the core section, thereby eliminating the application of a locally excessive load on the permanent magnet during high speed rotation.

BRIEF DESCRIPTION OF THE DRAWINGS

FIG. 1 is a longitudinal sectional view, in half, of a prior art permanent magnet type synchronous motor.

FIG. 2 is a cross-sectional view of the motor of FIG. 1 taken on line II-II.

FIG. 3 is a cross-sectional view of FIG. 1 taken on line III—III.

FIG. 4 is a partially enlarged view of FIG. 1.

FIG. 5 is a longitudinal sectional view, in half, of a permanent magnet type synchronous motor according to the invention.

DESCRIPTION OF THE PREFERRED EMBODIMENT

Figure 6:
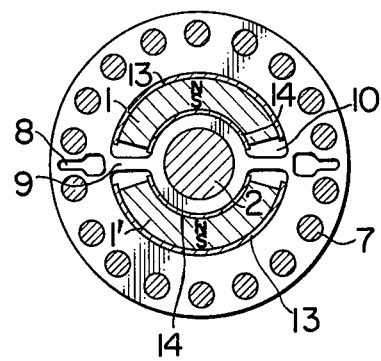
FIG. 6 is a cross-sectional view of the motor of FIG. 5 taken on line VI—VI.
Figure 7:
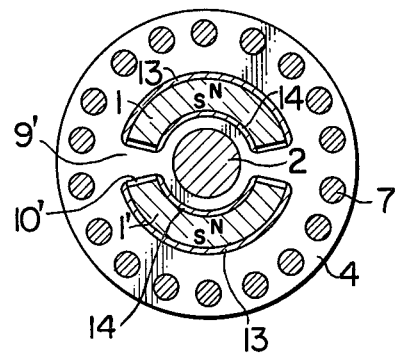
FIG. 7 is a cross-sectional view of the motor of FIG. 5 taken on line VII—VII.

Referring now to FIGS. 5, 6 and 7, one embodiment of the invention will be described. In these figures, like numerals designate like elements of FIGS. 1 to 4.

In accordance with the invention, a strap 13 made of a thin steel sheet is mounted on the outer surface of respective permanent magnets 1 and 1', and a strap 14 also made of a thin steel sheet is mounted on the inner surface of the respective permanent magnets 1 and 1'. The straps 13 and 14 have a length larger than the axial length of permanent magnets 1 and 1' and they are interposed between a rotor core 3 including a reinforcement plate 4 and the magnets 1 and 1'. Because of symmetry, the construction will be described hereinafter by referring to one of the permanent magnets, that is, permanent magnet 1.

Accordingly, the permanent magnet 1 opposes the rotor core 3 and the reinforcement plate 4 through the outer strap 13 and inner strap 14 so that it can be in intimate contact with the rotor core 3 and reinforcement plate 4 with less irregularity at the interface than when in direct contact with them. Therefore, the permanent magnet 1 will not be imparted with a local force and is robust and stable against a high speed rotation of the rotor.

It is not essential that the outer and inner straps 13 and 14 are made of a magnetic material but the outer and inner straps 13 and 14 can be of a magnetic material with the following advantage. More particularly, in the prior art rotor without the strap, the magnetic flux of the permanent magnet 1 is so distributed as to be less at one portion of the permanent magnet opposing the non-magnetic reinforcement plate 4 then at the other portion opposing the rotor core 3. In contrast thereto, by the provision of the strap, the magnetic flux distribution of permanent magnet can be uniformed so that the amount of magnetic flux will be increased.

Figure 8A:
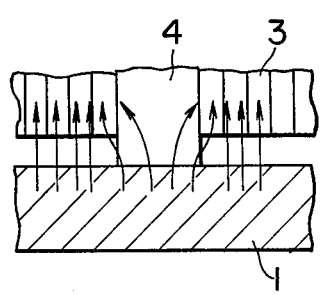
FIG. 8A is a diagrammatic representation showing magnetic flux distribution near the reinforcement plate of rotor when a strap is not used.
Figure 8B:
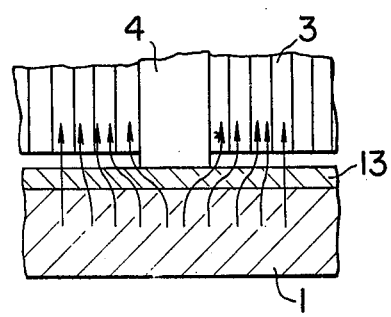
FIG. 8B is a similar diagram to FIG. 8A when a strap is used.

This will be described in more detail with reference to FIGS. 8A and 8B. In case of the prior art rotor structure without the strap, as shown in FIG. 8A, magnetic flux directed to the core 3 from one portion of the permanent magnet abutting the reinforcement plate 4 is distributed in accordance with permeability $\mu$ of the reinforcement plate which is non-magnetic (for stainless steel reinforcement plate, $\mu = 1$) with the result that the density of magnetic flux is decreased at this portion. In contrast, with the rotor structure of the invention, as shown in FIG. 8B, the magnetic flux from the one portion of permanent magnet opposing the reinforcement plate 4 is directed to the core 3 via a low reluctance path established by the strap 3 made of a magnetic material (for thin steel sheet, $\mu > 1000$) so that the density of magnetic flux will not be decreased considerably at this portion.

As has been described, in accordance with this invention the strap is interposed between the rotor including the non-magnetic reinforcement and core sections and the outer and inner surfaces of permanent magnet to decrease the shoulder at the interface between both sections to that even when the rotor rotates at a high speed, the permanent magnet will not be imparted with a local load which is responsible for the creation of cracks in the permanent magnet, thereby ensuring stable rotation of the rotor.

I claim:

1. A rotor of a permanent magnet type synchrnous motor comprising:
    a rotary shaft;
    a rotor body including a plurality of core sections each of which is in the form of a lamination of a magnetic material, a reinforcement section of a nonmagnetic material interposed between the core sections, said core and reinforcement sections being alternately mounted on the rotary shaft and secured thereto, and a plurality of cavities axially formed in the core and reinforcement sections by passing therethrough, said cavities being each defined by inner and outer walls in the form of a substantial circular arc which are concentric with the rotary shaft and two radial walls;
    a permanent magnet received in the respective cavities which has substantially the same configuration as the cavity including inner and outer surfaces in the form of a substantial circular arc; and
    magnet protecting means including a first strap interposed between at least the outer circular arc wall of the respective cavities and the outer surface of the permanent magnet opposing the outer circular arc wall, said first strap covering the entire outer surface of said permanent magnet to protect said permanent magnet from forces caused by high speed rotation of the rotor body.

2. The rotor according to claim 1, wherein said magnet protecting means further comprises a second strap interposed between the inner circular arc wall of the respective cavities and the inner surface of the permanent magnet opposing the inner circular arc wall, said second strap covering the entire inner surface of said permanent magnet to further protect said permanent magnet from forces caused by high speed rotation of the rotor body.

3. The rotor structure according to claim 1, wherein said first strap comprises a magnetic material.

4. The rotor structure according to claim 1, wherein said first strap comprises a magnetic material.

5. The rotor structure according to claim 2, wherein both of said first and second straps comprise a magnetic material.

6. The rotor structure according to claim 2, wherein both of said first and second straps comprise a magnetic material.

* * * * *